United States Patent [19]

Black

[11] Patent Number: 4,483,684

[45] Date of Patent: Nov. 20, 1984

[54] TORSIONAL IMPULSE DAMPER FOR DIRECT CONNECTION TO UNIVERSAL JOINT DRIVE SHAFT

[75] Inventor: James B. Black, Roscoe, Ill.

[73] Assignee: Twin Disc, Inc., Racine, Wis.

[21] Appl. No.: 526,334

[22] Filed: Aug. 25, 1983

[51] Int. Cl.³ .............................................. F16D 3/14
[52] U.S. Cl. .................................. 464/68; 192/106.2; 464/64
[58] Field of Search ..................... 464/63, 64, 66, 68, 464/62, 65, 85; 192/106.1, 106.2

[56] References Cited

U.S. PATENT DOCUMENTS

| | | | |
|---|---|---|---|
| 2,437,537 | 3/1948 | Kelleher | 464/68 |
| 2,533,789 | 12/1950 | Goodchild | 464/85 X |
| 2,613,785 | 10/1952 | Mohns | 464/68 X |
| 2,826,901 | 3/1958 | Barrenechea | 464/68 |
| 2,920,733 | 1/1960 | Lysett | 192/106.2 |
| 4,101,015 | 7/1978 | Radke | 192/106.2 |
| 4,318,283 | 3/1982 | Windish | 464/68 |
| 4,351,168 | 9/1982 | Prince et al. | 464/64 |

Primary Examiner—John Petrakes
Attorney, Agent, or Firm—James E. Nilles

[57] ABSTRACT

The driving member of this torsional impulse damper is a disc-like plate, coaxially securable at its peripheral portions to an engine flywheel. The driven member comprises two carrier elements, at opposite sides of the driving member, rigidly connected at bosses that are spaced from the rotational axis and extend through larger holes in the driving member. Friction surfaces on inner faces of the carrier elements engage the opposite flat faces of the driving member. Cooperating with the friction surfaces to maintain the driving and driven members coaxial is a coaxial trunnion on one carrier element projecting into a bearing fitted in a central hole in the driving member. The carrier elements cooperate to enclose springs that react between the driving and driven members. A universal joint at one end of a drive shaft is directly connected to one of the carrier elements.

6 Claims, 7 Drawing Figures

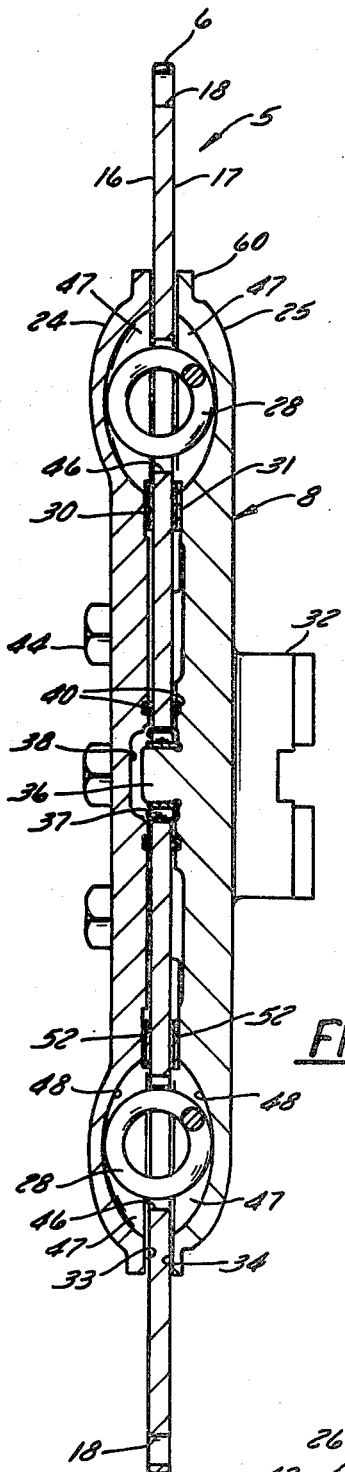
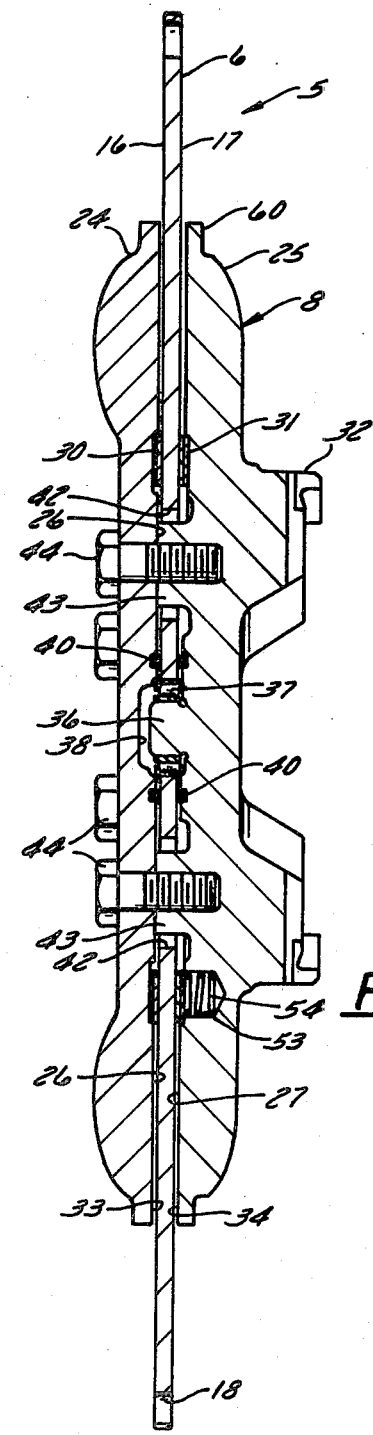
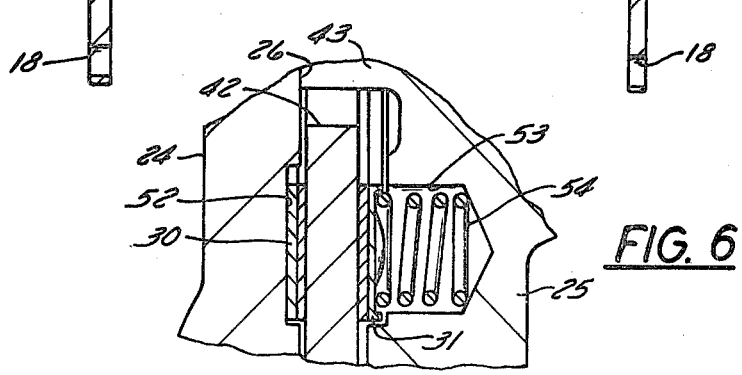

TORSIONAL IMPULSE DAMPER FOR DIRECT CONNECTION TO UNIVERSAL JOINT DRIVE SHAFT

FIELD OF THE INVENTION

This invention relates to a torsional impulse damper which can be coaxially secured to a flywheel or similar rotatable element of a prime mover and to which can be directly connected one end of a drive shaft that comprises a universal joint; and the invention is more particularly concerned with a simple and sturdy torsional impulse damper which does not have a shaft extending through it to pilot its driving and driven members but which can nevertheless be coupled to a universal-joint drive shaft.

BACKGROUND OF THE INVENTION

A fram tractor powered by a diesel engine exemplifies the conditions that call for the use of a torsional impulse damper. At any nominal speed of the diesel engine, the instantaneous speed of rotation of its crankshaft tends to fluctuate constantly, owing to events that occur during the engine cycle. If such speed variations are carried into the drive train, they produce vibration of the machine, may cause a certain amount of noise, and can subject the drive train to abrupt and constantly recurring high torsional loads that may damage its parts. A torsional impulse damper is therefore connected between the engine and the input shaft of the drive train, to smooth the torque variations of the engine.

In general, such a damper comprises a rotatable driving member connectable with the engine and a driven member that is coaxially rotatable with the driving member and is coaxially rotatable relative to it to a limited extent. Springs are so connected between the driving member and the driven member as to permit yielding relative rotation between them whereby the driving member is allowed to accelerate and decelerate with the engine and relative to the driven member, and these accelerations and decelerations are damped by friction means reacting between the driving member and the driven member.

In a typical prior torsional vibration damper installation, the driving member of the torsion damper had circumferential connections with the engine flywheel whereby it was constrained to coaxial rotation with the flywheel, while the driven member had a splined connection with an intermediate shaft that was confined to rotation on an axis coinciding with that of the flywheel. The intermediate shaft was supported at a front end thereof by a coaxial bearing in the flywheel, and its rear end portion projected through a flywheel housing in which there was a coaxial rear bearing for it. The rearmost portion of the intermediate shaft, which was outside the flywheel housing, had a universal joint connection with a drive shaft that extended rearwardly towards a driven mechanism.

It will be apparent that this arrangement was bulky, complicated and expensive. It required that the flywheel or the flywheel end of the crankshaft be provided with an accurately coaxial socket for the intermediate shaft front bearing; and to maintain the intermediate shaft coaxial with the flywheel, the flywheel housing that carried the rear bearing for the intermediate shaft had to project a substantial distance behind the flywheel and had to be rigid in itself and rigidly attached to the engine body.

There was no obvious way to reduce the cost, bulk and complexity of this prior construction because of the several requirements that must be met when a torsional impulse damper is connected between a flywheel and a universal joint drive shaft. One important requirement is that the front end of the universal joint shaft must have a connection that remains coaxial with the flywheel. The driving and driven members of the damper must be maintained in coaxial relation to one another as well as being free for limited rotation relative to one another. Another requirement is that any bearings in the system be well protected from dust and dirt. It is also highly desirable that the spring or springs of the damper as well as the friction sufaces of its driving and driven members be protectively enclosed. The flywheel should also be enclosed, and this implies that there should in any case be some type of housing for it. Thus each of the many parts of the above described prior mechanism served to meet one or more of these requirements, so that there seemed to be no satisfactory way of eliminating any of them.

SUMMARY OF THE INVENTION

The general object of the present invention is to provide a torsional impulse damper that can have its driving member connected to an engine flywheel, as heretofore, but which can have its driven member connected directly to a universal joint at the front end of a drive shaft, thus providing an installation that is substantially less bulky, expensive and complicated than those heretofore available, permitting the flywheel housing to be substantially smaller than was heretofore considered necessary and eliminating the previously used intermediate shaft and its bearings.

It is also a general object of this invention to provide a torsional impulse damper that has a driven member to which a drive shaft universal joint can be directly connected and wherein a coaxial trunnion connection between the driving and driven members of the damper as well as the springs and friction means that react between those members are protectively enclosed by the members of the damper itself.

A more specific object of this invention is to provide a torsional impulse damper wherein the driven member comprises a pair of carrier elements that are fixed to one another on coaxial relation to the driving member and at axially opposite sides thereof, wherein springs that are protectively enclosed by the carrier elements are connected between the driving member and the driven member to allow the latter to have yielding rotation relative to the driving member, and wherein means that provide for the securement of the carrier elements to one another also serve as stops that limit relative rotation between the driving member and the driven member and thus prevent overloading of the springs.

Another specific object of the invention is to provide a torsional impulse damper of the construction just described wherein a single radial thrust bearing is arranged to cooperate with the driving and driven members to maintain them in coaxial relation to one another, and wherein the connected carrier elements that comprise the driven member cooperate with the driving member to provide a seal around that bearing.

A further specific object of the invention is to provide a torsional impulse damper of the construction just described wherein the friction means that reacts between the driving and driven members to retard relative rotation between them also serves to resist tilting forces on the driven member that tend to swing its axis out of coincidence with the axis of the driving member.

It is also a specific object of this invention to provide a torsional impulse damper having a driving member comprising a disc-like plate with means on its peripheral portions that provide for its coaxial securement to an engine flywheel and having a driven member which is directly connectable to a universal joint at the front end of a rearwardly extending drive shaft, said damper being so configured and arranged that a housing which encloses said flywheel can have a rear wall which closely overlies the rear face of the flywheel and which has slidable sealing engagement with an annular surface on said driven member.

In general, these and other objects of the invention that will appear as the description proceeds are attained in the torsional impulse damper of this invention, which has a driving member connectable with an engine flywheel for coaxial rotation therewith and has a coaxial driven member that is confined to limited rotation relative to the driving member and is connectable with a universal joint at one end of a drive shaft that has its other end connected with a driven mechanism, there being spring means and friction means reacting between said driving and driven members to yieldingly retard relative rotation between them and thus prevent imposition upon the driven mechanism of abrupt changes in rotational speed of the flywheel. The damper of this invention is characterized in that its driving member comprises a disc-like plate having an axis and having axially opposite substantially flat faces, and further having a plurality of holes through it that are spaced from its said axis and from one another, and means on its peripheral portion providing for its coaxial securement to a flywheel. The driven member comprises a pair of carrier elements, one adjacent to each said face of the driving member, each having an axialy inner side that opposes its adjacent face of the driving member and an opposite axially outer side, and securement means extending through said holes in the driving member and connecting said carrier elements in fixed relation to one another with their axes coinciding. There are means on the outer side of one of said carrier elements for coaxial securement of a universal joint thereto. The damper is further characterized by means rotatably confining the driving and driven members against radial displacement out of coaxial relationship to one another, comprising a coaxial trunnion on one of said members and a coaxial bearing on the other of said members in which said trunnion is rotatably received; and by said friction means being on an inner side of at least one of said carrier elements and defining a friction area thereon which engages the adjacent face of the driving member under axial force to frictionally retard relative rotation between said carrier element and the driving member and to resist tilting of the axes of the carrier elements out of coincidence with the axis of the driving member.

Other features of the invention, and particularly features that characterize a preferred embodiment of the invention, are pointed out hereinafter.

BRIEF DESCRIPTION OF DRAWINGS

In the accompanying drawings, which illustrate what is now regarded as a preferred embodiment of the invention:

FIGS. 4 and 5 are sectional views respectively taken on the plane of the line 4—4 and the plane of the line 5—5 in FIG. 2;

FIG. 6 is a detail sectional view on an enlarged scale taken on the same plane as FIG. 5, showing the friction ring arrangement.

DETAILED DESCRIPTION OF PREFERRED EMBODIMENT OF THE INVENTION

Figure 1:
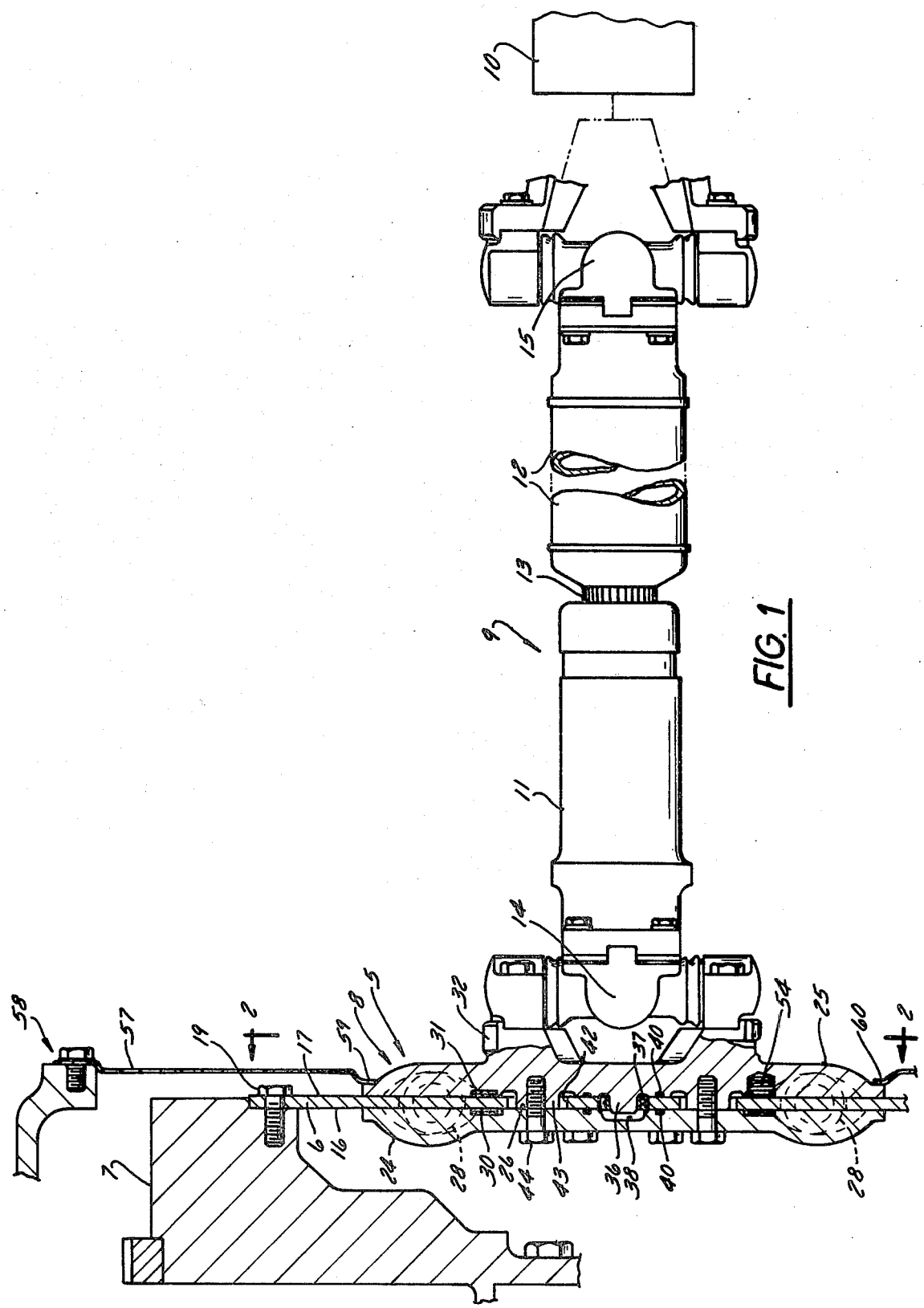
FIG. 1 is a view, partly in side elevation and partly in vertical section, of a torsional impulse damper of this invention in assembled relationship to an engine flywheel and a universal joint drive shaft whereby torque is transmitted from the engine to a driven mechanism.
Figure 2:
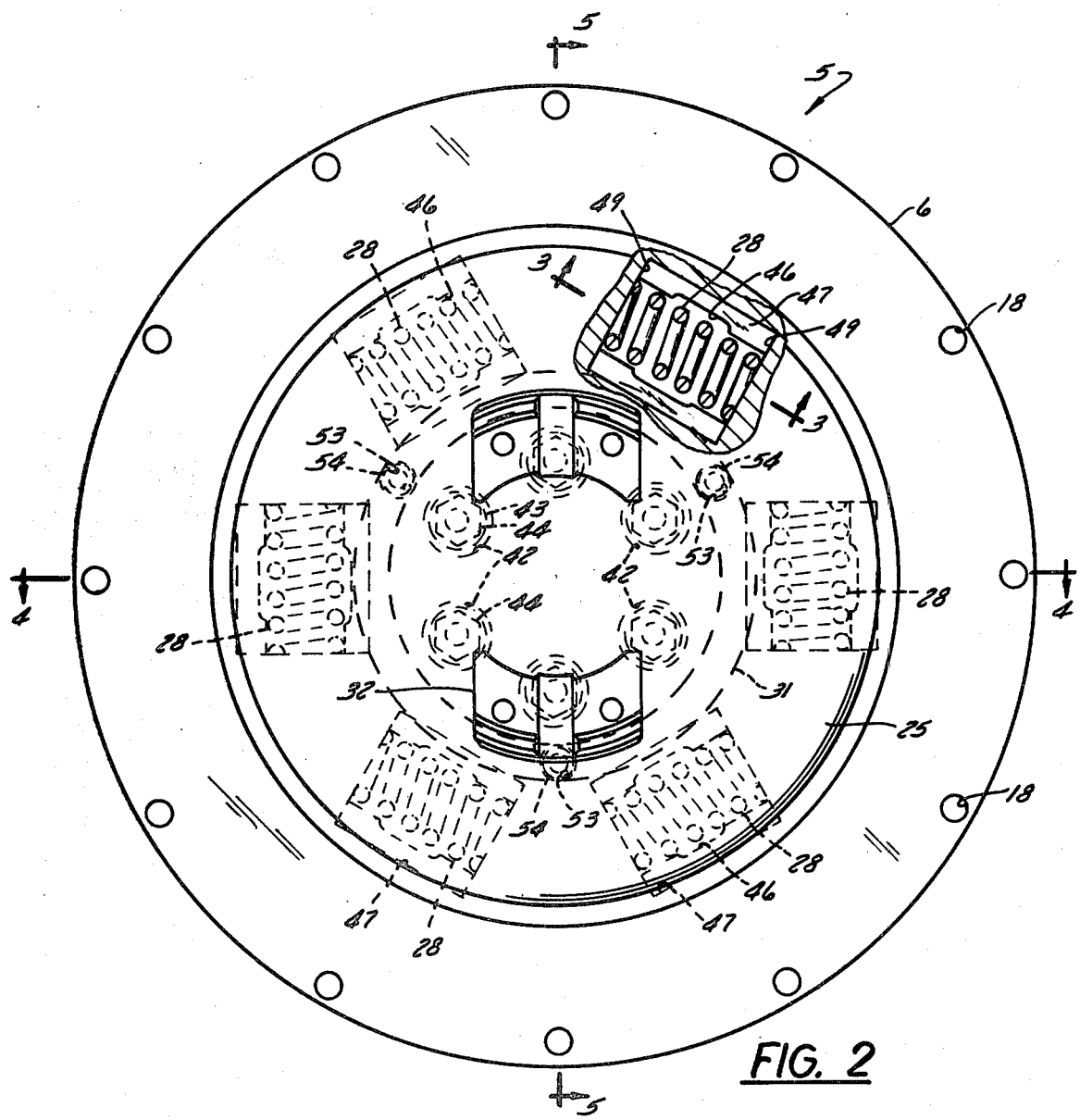
FIG. 2 is a view in section taken on the plane of the line 2—2 in FIG. 1.
Figure 3:
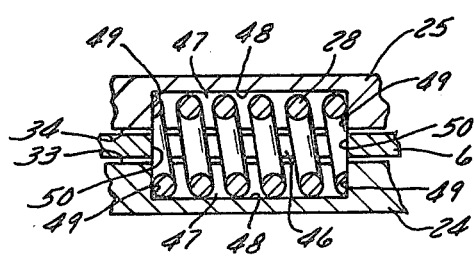
FIG. 3 is a detail sectional view taken on the plane of the line 3—3 in FIG. 2.
Figure 7:
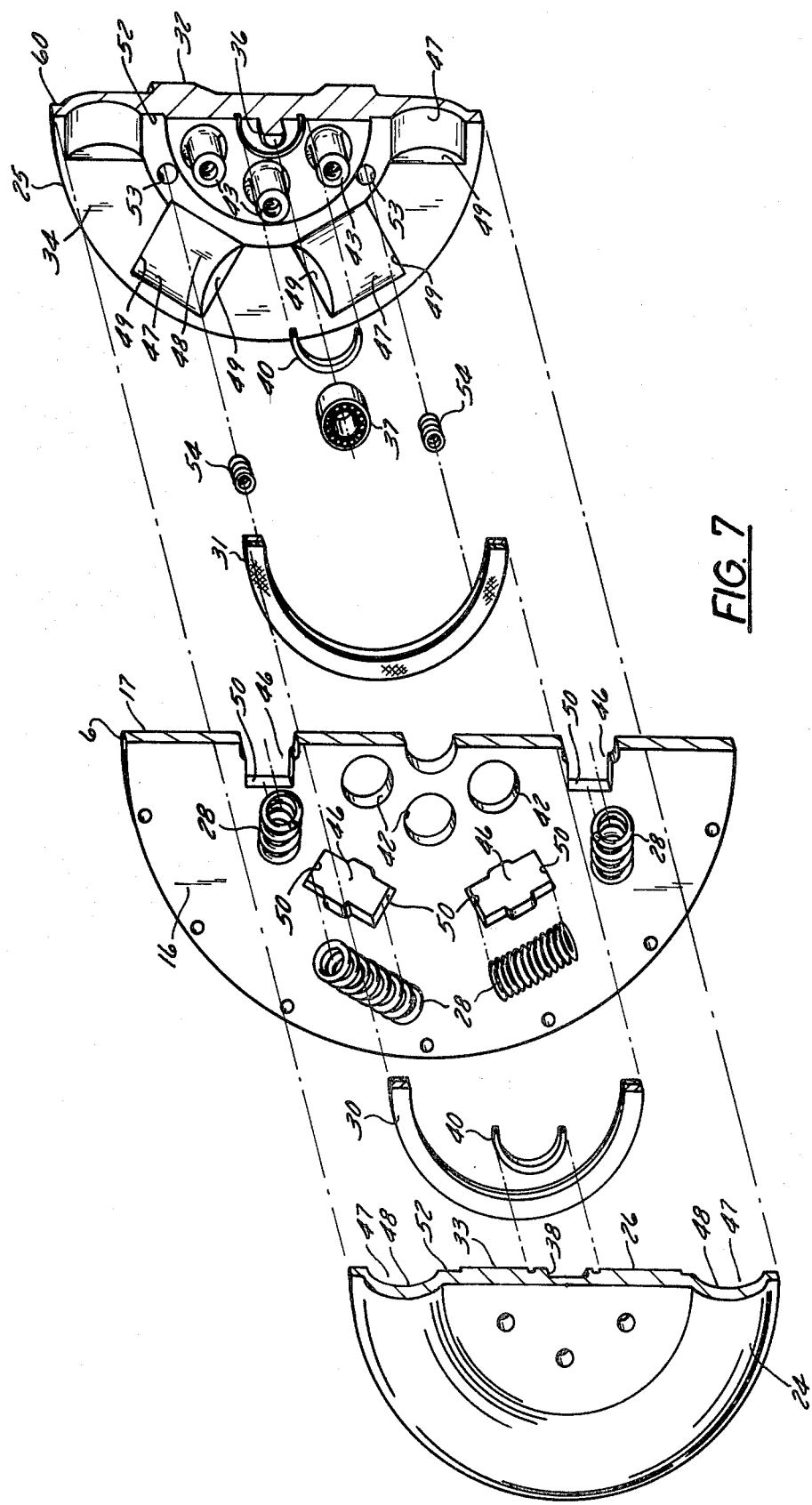
FIG. 7 is an exploded perspective view, but with the parts broken away on the plane of FIG. 4.

A torsional impulse damper 5 of this invention has a driving member 6 that is adapted to be rigidly coaxially secured to an engine flywheel 7 and has a driven member 8 that is adapted for direct connection to a universal joint drive shaft 9 whereby rotation of the flywheel 7 is transmitted to a driven mechanism 10. To accommodate a certain amount of shifting of the driven mechanism 10 relative to the flywheel 7, the drive shaft 9 comprises front and rear sections 11 and 12 that are splinedly connected, as at 13, and it has a front universal joint 14 for connection with the damper 5 and a rear universal joint 15 for connection with the driven mechanism 10. It will be apparent that the connection between the front universal joint 14 and the driven member 8 of the damper 5 must be maintained coaxial with the flywheel 7 for satisfactory torque transmission, and as the description proceeds it will become apparent that the damper 5 of this invention ensures such coaxiality.

The driving member 6 of the damper 5 is a disc-like plate having axially opposite front and rear flat faces 16, 17. Circumferentially spaced holes 18 in the peripheral portion of the driving member provide for its coaxial securement to the flywheel 7, as by means of bolts 19 that extend through the holes 18 and are threaded into the flywheel.

The driven member 8 comprises front and rear circular carrier elements 24 and 25, which are respectively adjacent to the front and rear faces 16 and 17 of the driving member 6, so that the driving member is between the two carrier elements. As explained hereinafter, the carrier elements 24, 25, which are substantially smaller in diameter than the driving member 6, are connected in rigidly fixed relation to one another and are maintained coaxial with the driving member 6. As is also explained hereinafter, the driven member 8 that comprises the connected carrier elements 24, 25 can have limited rotation relative to the driving member 6, and such rotation is yieldingly resisted by springs 28 that react between the driving and driven members and is frictionally retarded by friction rings 30, 31.

Each carrier element 24, 25 has an axially inner side on which there are flat, coplanar surface portions 33, 34 that oppose its adjacent flat face 16 or 17 of the driving member. On the axially opposite outer or rear side of the rear carrier element 25 there is a boss-like formation 32 that comprises a socket in which one of the cross-trunnions of the front universal joint 14 is pivotably secured. The intersection of the axes of the cross-trunnions of that universal joint 14 is on the coinciding axes of the flywheel 7 and of the driving and driven members 6 and 8.

For maintaining the driven member 8 in coaxially rotatable relationship to the driving member 6, one of those members has a coaxial trunnion 36 that is received in a coaxial bearing 37 carried by the other member. As here illustrated, and as is preferred, the trunnion 36 is formed integrally with the rear carrier element 25 and projects axially forwardly beyond its flat inner surface portions 34, while the bearing 37, which is preferably a needle bearing, is fitted in a central bearing hole in the disc-like driving member 6. The front end portion of the trunnion 36 is received with substantial clearance in a rearwardly opening coaxial well 38 in the front carrier element 24. It will be noted that the trunnion 36 is wholly disposed between the axially outer surfaces of the driven member 8, in contrast to prior damper installations in which a shaft extended through the damper and projected beyond it in both axial directions.

The bearing 37 is sealed against the intrusion of dust and dirt by means of a pair of elastomeric sealing rings 40, one for each carrier element 24, 25, each concentrically surrounding the bearing. Each of the carrier elements 24, 25 has an annular, axially inwardly opening groove in its inner face in which its sealing ring 40 is seated, and each sealing ring is of course confined under axial compression between its carrier element 24, 25 and the adjacent flat face 16, 17 of the driving member.

To provide for rigid connection of the carrier elements 24, 25 to one another, the driving member 6 has a plurality of abutment apertures 42 therethrough, centered on a circle of substantially larger radius than the sealing rings 40. There are at least three such holes 42 (preferably six of them), spaced apart at uniform circumferential intervals. On one of the carrier elements, in this case the rear carrier element 25, there are a like number of bosses 43, each projecting inwardly beyond the plane of the flat inner surface portions 34 of that carrier element and through one of the abutment holes 42 to engage the opposing flat inner surface 26 on the other carrier element 24. Threaded rearwardly into each boss 43 is a bolt 44 that extends through the front carrier element 24. Preferably, as here shown, the bosses 43 and their apertures 42 are circular, the centers of the bosses being on a concentric circle of the same radius as that on which the holes 42 are centered, but the several bosses 43 are of substantially smaller diameter than the respective abutment apertures 42 in which they are received, to permit relative rotation between the driving and driven members. The limits of such relative rotation are defined by engagement of the bosses 43 against edges of their respective abutment apertures 42.

The bosses 43, in their engagement with the flat surface portions 26 on the front carrier element 24, define the axial distance between the flat inner surfaces 26, 27 on the two carrier elements 24, 25, and that distance is slightly greater than the thickness of the driving member disc 6 but small enough to confine the sealing rings 40 in axially compressive engagement with the driving member.

To accommodate the damper springs 28, the driving member 6 has a plurality of substantially rectangular spring apertures 46 therethrough, in a concentric circle radially outward of the bosses 43, and each of the carrier elements 24, 25 has a like number of inwardly opening spring cavities 47, each of which normally registers with one of the spring apertures 46 in the driving member. Each spring cavity 47 has a concave inwardly opening surface 48 and has opposing flat end surfaces 49 that face substantially circumferentially but are parallel to one another. Each spring aperture 46 in the driving member has parallel end edges 50 that are spaced apart by the same distance as the end surfaces 49 of its registering spring cavities 47 in the driven member. Thus a spring cavity 47 in each carrier element 24, 25 cooperates with a registering spring aperture 46 in the driving member 6 and with an opposing spring cavity 47 in the other carrier element 25, 24 to house one of the coiled damper springs 28.

Each spring 28 is under axial compression, with its opposite ends bearing against the end surfaces 49 of its spring cavities and the end edges 50 of its spring aperture in the driving member. The springs 28 thus react between the driving member 6 and the driven member 8 to urge them to rotate in unison, but the springs yield to permit limited rotation of either of those members relative to the other, in either direction. The limits of such relative rotation are defined by engagement of the bosses 43 against edge portions of the abutment holes 42 in the driving member, and such engagement prevents the imposition of excessive forces upon the springs. The driving member 6 and the carrier elements 24, 25 that comprise the driven member 8 can be configured, as shown, to accommodate six springs 28, but it will be apparent that a damper of lesser stiffness can be obtained by using only three springs 28, installed in alternate spring holes 46 around the driving member.

The friction rings 30 and 31, which cooperate with the springs 28 in damping torsional impulses, are confined between the driving member 6 and the carrier elements 24 and 25, respectively. Each of the friction rings 30, 31 is relatively flat and is maintained concentric to the axis of the rotating parts by being closely received in a shallow, flat-bottomed inwardly opening groove 52 in its carrier element 24, 25. One of the carrier elements—the rear carrier element 25 as here shown—has circumferentially equidistant spring wells 53 that open to its friction ring groove 52, in each of which is housed a coiled compression spring 54 that reacts between that carrier element and its adjacent friction ring 31 to urge the latter into frictional engagement with the adjacent face 17 of the driving member 6. In turn, the reaction of the friction ring springs 54 against the rear carrier element 25 draws the front carrier element 24 rearwardly, so that the other friction ring 30 is clampingly confined between the front carrier element 24 and the front face 16 of the driving member. To constrain the rear friction ring 31 to rotate with the rear carrier element 25, that friction ring has shallow rearwardly opening wells in which front end portions of the springs 54 engage.

The friction rings 30, 31 surround the circle of bosses 43. Because the friction rings are at a substantial distance from the coinciding axes of the driving and driven members, and are clampingly confined against the opposite faces 16, 17 of the driving member, they resist forces that tend to tilt the axis of the driven member 8 out of coinciding relationship with that of the driving member 6. Such forces are not likely to be large, because the connection of the front drive shaft universal joint 14 to the rear carrier element 25 is not far behind the bearing 37 and therefore has a small moment about that bearing. Furthermore, any exceptional tilting force that might result in compression of one of the friction ring springs 54 could not produce any substantial amount of swing of the driven member axis about the bearing 37, owing to the small distance between the flat surfaces 33, 34 of the carrier elements 24, 25 and their opposing faces 16, 17 of the driving member.

The rear wall 57 of the flywheel housing 58 can be of relatively light sheet metal, with a relatively large hole in it which is concentric to the flywheel axis and which is surrounded by a lip 59 that slidingly engages a flat, rearwardly facing annular sealing surface 60 on the rear carrier element 25, adjacent to its periphery.

From the foregoing description it will be apparent that this invention provides a torsional impulse damper having a driving member which is coaxially securable to an engine flywheel and having a driven member which is directly securable to a drive shaft universal joint, eliminating the need for the intermediate shaft heretofore commonly employed with dampers connected between an engine flywheel and a drive shaft having universal joints, and thus also eliminating the need for a bulky, rigid housing projecting beyond the flywheel as well as eliminating the bearings for the intermediate shaft that were mounted in that housing and in the flywheel.

What is claimed as the invention is:

1. A torsional impulse damper having a driving member connectable with an engine flywheel for coaxial rotation therewith and having a coaxial driven member that is confined to limited rotation relative to the driving member and is connectable with a universal joint at one end of a drive shaft that has its other end connected with a driven mechanism, said damper further having spring means and friction means reacting between said driving and driven members to yieldingly retard relative rotation between them and thus prevent imposition upon the driven mechanism of abrupt changes in rotational speed of the flywheel, said damper being characterized by:
   A. said driving member comprising a disc-like plate having an axis and having axially opposite substantially flat faces, and further having
      (1) a plurality of holes through it that are spaced from its said axis and from one another, and
      (2) means on its peripheral portion providing for its coaxial securement to a flywheel;
   B. said driven member comprising
      (1) a pair of carrier elements, each having an axis, one adjacent to each said face of the driving member, each having an axially inner side that opposes its adjacent face of the driving member and an opposite axially outer side, and
      (2) securement means extending through said holes in the driving member and connecting said carrier elements in fixed relation to one another with their axes coinciding;
   C. means on said outer side of one of said carrier elements for coaxial securement of a universal joint thereto;
   D. means rotatably confining said driving and driven members against radial displacement out of coaxial relationship to one another, comprising
      (1) a coaxial trunnion on one of said members, and
      (2) a coaxial bearing on the other of said members in which said trunnion is rotatably received; and
   E. said friction means being on the inner side of at least one of said carrier elements and defining a friction area thereon which engages the adjacent face of the driving member to frictionally retard relative rotation between said carrier element and the driving member and to resist tilting of the axes of the carrier elements out of coincidence with the axis of the driving member.

2. The torsional impulse damper of claim 1, further characterized by:
   (1) said driving member having a plurality of like spring apertures therein which are spaced at like distances from its axis and at uniform circumferential intervals from one another;
   (2) each of said carrier elements having a plurality of like spring cavities at the inner side thereof, one for each spring aperture, and each opening into its spring aperture; and
   (3) a plurality of like coil springs, one for each spring aperture, each received under compression in its spring aperture and the spring cavities which open thereto so that the several springs cooperate in yieldingly resisting relative rotation between the driving and driven members.

3. The torsional impulse damper of claim 1, further characterized by:
   said securement means comprising
   (1) a plurality of bosses on one of said carrier elements, one for each of said holes in the driving member, each projecting into its hole and engaged against the other carrier element, each of said bosses being smaller than its hole to permit relative rotation between the driving member and the driven member and being engageable with opposite edge portions of its hole to define limits of such rotation; and
   (2) a plurality of bolts extending through said other carrier element and threaded into at least certain of said bosses.

4. The torsional impulse damper of claim 1 wherein said coaxial trunnion is on one of said carrier elements and projects inwardly from said axially inner side thereof, and wherein said bearing is confined in a central hole in the driving member.

5. The torsional impulse damper of claim 4, further characterized by:
   (1) each of said carrier elements having at its said axially inner side a concentric annular sealing ring groove in surrounding relation to said bearing; and
   (2) a resilient sealing ring in said sealing ring groove of each carrier element, confined under axial compression between the carrier element and the adjacent face of the driving member.

6. A torsional impulse damper having a driving member connectable with an engine flywheel for coaxial rotation therewith and having a coaxial driven member that is confined to limited rotation relative to the driving member and is connectable with a universal joint at one end of a drive shaft that has its other end connected with a driven mechanism, said damper further having spring means and friction means reacting between said driving and driven members to yieldingly retard relative rotation between them and thus prevent imposition upon the driven mechanism of abrupt changes in rotational speed of the flywheel, said damper being characterized by:
   A. said driven member comprising
      (1) a pair of carrier elements, each having (a) an axially inner side on which there are flat and coplanar surface areas that are spaced from said axis and
(b) an axially outer side, and
(2) cooperating securement means on said carrier elements, at locations spaced from one another and from the axes of the carrier elements, connecting the carrier elements in fixed relation to one another with their axes coinciding and their said surface areas spaced apart and opposing one another;

B. said driving member comprising a disc-like plate between the carrier elements, having an axis coinciding with the axes of the carrier elements and having axially opposite substantially flat faces that are frictionally engaged by said surface areas in the carrier elements, said driving member further having (1) a plurality of holes therethrough that are spaced from its axis and through which said securement means extend, said holes being larger than the securement means to permit relative rotation between the driving and driven members, and
(2) means on the peripheral portion of the driving member providing for its coaxial securement to a flywheel;

C. means cooperating with said flat faces on the driving member and said surface areas on the carrier elements to confine the driving and driven members in coaxial relatively rotatable relationship to one another, the last mentioned means comprising
(1) a coaxial trunnion on one of said members and
(2) a coaxial bearing on the other of said members in which said trunnion is rotatably received; and D. means on said axially outer side of one of said carrier elements for coaxial securement of a universal joint thereto.

* * * * *